US007693907B1

(12) United States Patent
Lee et al.

(10) Patent No.: US 7,693,907 B1
(45) Date of Patent: Apr. 6, 2010

(54) SELECTION FOR A MOBILE DEVICE USING WEIGHTED VIRTUAL TITLES

(75) Inventors: Younghyun Lee, Seongnam-si (KR); Hyunwook Kim, Gwanak-Gu (KR)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/358,183

(22) Filed: Jan. 22, 2009

(51) Int. Cl.
G06F 7/00 (2006.01)
G06F 17/30 (2006.01)

(52) U.S. Cl. .................................... 707/749; 707/758
(58) Field of Classification Search ............... 707/104.1
See application file for complete search history.

(56) References Cited

U.S. PATENT DOCUMENTS

| | | | |
|---|---|---|---|
| 6,842,761 B2 | 1/2005 | Diamond et al. | |
| 7,047,033 B2 | 5/2006 | Wyler et al. | |
| 7,065,345 B2 | 6/2006 | Carlton et al. | |
| 7,137,067 B2 | 11/2006 | Yanase et al. | |
| 7,149,537 B1 | 12/2006 | Kupsh et al. | |
| 7,336,964 B2 | 2/2008 | Casey | |
| 7,346,630 B2 | 3/2008 | Eichstaedt et al. | |
| 2003/0187834 A1* | 10/2003 | Oda et al. | 707/3 |
| 2005/0222981 A1 | 10/2005 | Lawrence et al. | |
| 2006/0194572 A1 | 8/2006 | Fresonke et al. | |
| 2006/0235885 A1 | 10/2006 | Steele et al. | |
| 2007/0060136 A1 | 3/2007 | Ramer et al. | |
| 2007/0067267 A1 | 3/2007 | Ives | |
| 2007/0143255 A1 | 6/2007 | Mathur et al. | |
| 2007/0156633 A1* | 7/2007 | Sugita | 707/1 |
| 2007/0184820 A1 | 8/2007 | Marshall | |
| 2007/0264987 A1 | 11/2007 | Gupta et al. | |
| 2008/0096605 A1 | 4/2008 | Gissin et al. | |
| 2008/0108341 A1 | 5/2008 | Baard | |
| 2008/0153467 A1 | 6/2008 | Wyler et al. | |

(Continued)

FOREIGN PATENT DOCUMENTS

EP 1435580 7/2004

(Continued)

OTHER PUBLICATIONS

"The Wall Street Journal Online and Outercurve Technologies Announce Launch of 'The Wall Street Journal for Blackberry,'" The Business Wire, New York, Feb. 15, 2005, 3 pgs.

(Continued)

*Primary Examiner*—Cam Y T Truong
(74) *Attorney, Agent, or Firm*—Darby & Darby P.C.; Jamie L. Wiegand

(57) ABSTRACT

Embodiments are directed towards selecting news formatted for a mobile device that is similar to currently popular desktop formatted news. Words are extracted from the desktop news and weighted based on various criteria. A comparison is then performed between the weighted words and available mobile news to identify similar mobile news. If an insufficient amount of mobile news is identified, then a revised similarity comparison is performed by modifying the keyword list using a virtual title weighted and/or sorted based in part on relevancy to the currently popular desktop formatted news. The resulting news articles formatted for mobile computing devices are then made available using a push and/or pull mechanism, instead of making available one of the news articles formatted for non-mobile computing devices.

18 Claims, 7 Drawing Sheets

U.S. PATENT DOCUMENTS

| | | |
|---|---|---|
| 2008/0200153 A1 | 8/2008 | Fitzpatrick et al. |
| 2008/0207137 A1 | 8/2008 | Maharajh et al. |
| 2008/0207182 A1 | 8/2008 | Maharajh et al. |
| 2008/0214154 A1 | 9/2008 | Ramer et al. |

FOREIGN PATENT DOCUMENTS

| | | |
|---|---|---|
| JP | 2003-271495 | 9/2003 |
| JP | 2005-063011 | 3/2005 |

OTHER PUBLICATIONS

"AvantGo Teams With Leading Publishers to Serve Up News for Mobile Users; Wired Digital, The New York Times, Mercury Center, InfoWorld and CNET Deliver Content For HandHelds," The Business Wire, May 18, 1998, 3 pgs.

"News to go: hierarchical text summarization for mobile devices," Proceedings of the 29th Annual International ACM SIGIR Conference on Research and Development in Information Retrieval, Aug. 6-11, 2006, Seattle, WA, 1 pg.

Podnar, Ivana et al., "m-NewsBoard: A News Dissemination Service for Mobile Users," 7th Int'l Conference on Telecommunications—ConTel 2003, vol. 1, Jun. 11-13, 2003, Croatia, p. 205-211 (7 pgs).

Rajendiran, et al., "Exploring the benefits of a continuous consistency model for wireless Web portals," The Second IEEE Workshop on Internet Applications, WIAPP, Jul. 23-24, 2001, San Jose, CA, 1 pg.

Armstrong, et al. "Efficient and transparent dynamic content updatses for mobile clients," The 4th Int'l Conference on Mobile Systems, New York, Jun. 19-22, 2006, 2 pgs.

* cited by examiner

SELECTION FOR A MOBILE DEVICE USING WEIGHTED VIRTUAL TITLES

TECHNICAL FIELD

The present invention relates generally to managing communications over a network and, more particularly, but not exclusively to selecting currently popular news to be made accessible by a mobile device based on a comparison between news titles formatted for a non-mobile device with news formatted for a mobile device.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to use their mobile device to read popular news articles and other information to maintain their knowledge of current events, learn more about the world around them, and so forth, so as to become a better citizen.

However, while much of ones news may be readily available on a non-mobile computing device, such as a desktop computer, a newspaper, or the like, some mobile services may have restricted access due to a variety of reasons, including, for example, legal constraints. Thus, sources for news for a mobile computing device may be limited. The limitation of such sources may also be restricted for a variety of other reasons beyond merely the issue of legal license, such as their format may not be preferable for some mobile screens. Therefore, news that may be currently popular might not be readily available for mobile devices.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
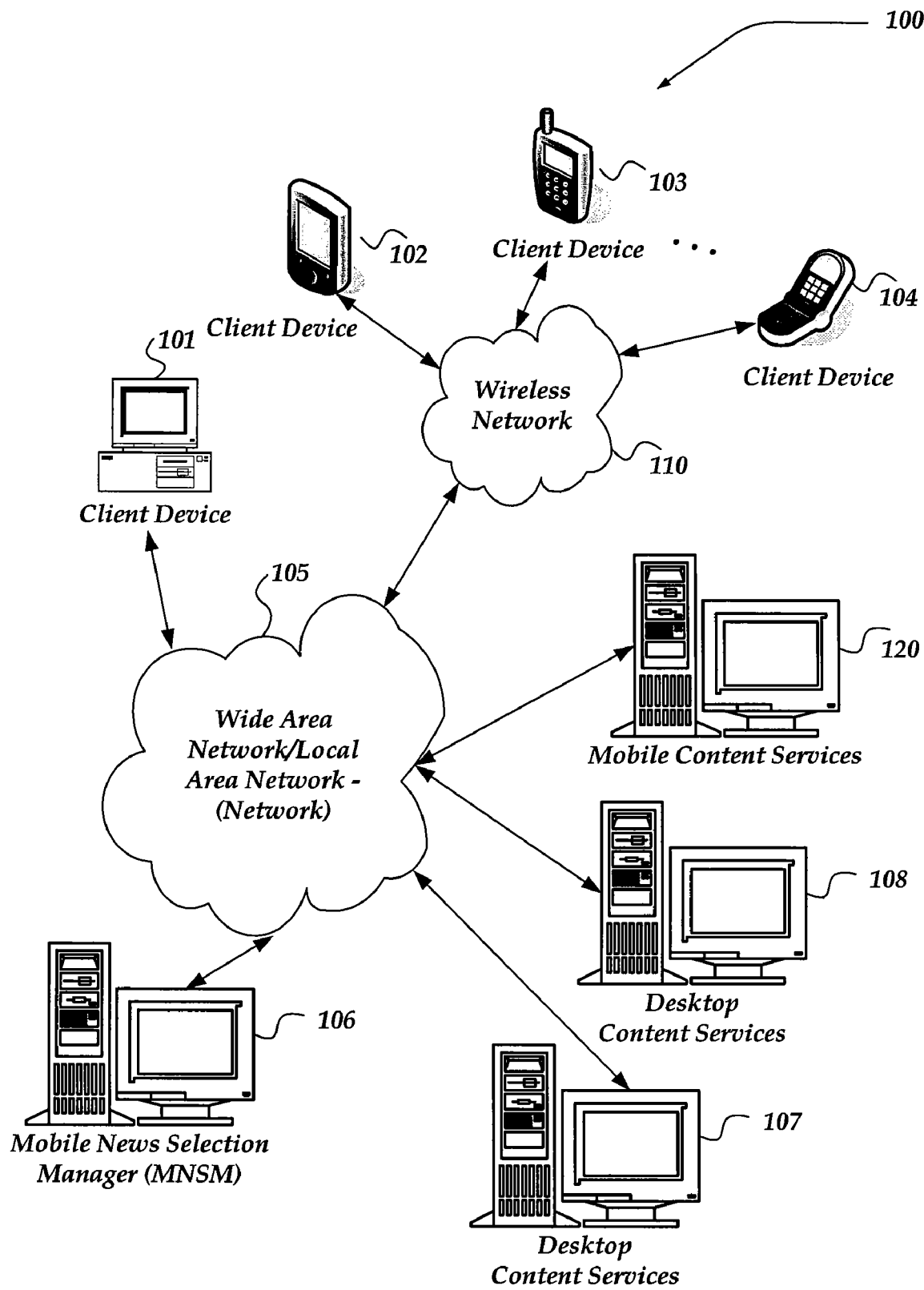
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards selecting news formatted for a mobile device that is determined to be similar to news that is determined to be currently popular and formatted for desktop computers (and/or other non-mobile type of computing devices). News formatted for desktop and/or other non-mobile devices that are determined to be current and popular is identified. In one embodiment, desktop formatted news is considered to be current based on a time window. Thus, for example, desktop formatted news that is identified to be made available over a network within a given time window around a current time may be selected as current news. Popular desktop formatted news may be determined based on a variety of criteria, including, but not limited to how often the article of desktop formatted news is read, how often it is sent to others (e.g., most emailed, or the like). However, other criteria may also be used. For example, popularity may also be based on a reader rating of the news, comments from readers for the news, or the like.

Words, known as keywords, are extracted from within titles from the current popular news formatted for non-mobile and weighted based on a pre-defined value for the words. Such pre-defined values may be determined based on historical information, context of news for a given day, given country, and/or other relevancy factors. In addition, the weighted words may be sorted based on a weighting, a frequency of occurrence, or the like.

News that may be formatted for mobile devices is then identified to generate a mobile news list. A similarity comparison is then performed between a title, body, and/or other parameters associated with the news in the mobile news list to the weighted keywords from the non-mobile currently popular news. By performing such a comparison, it is likely that news that might be considered less popular in the mobile domain may be identified as similar to currently popular news in the non-mobile domain. This surprising result may then identify previously unknown or less popular mobile news.

If a sufficient amount of mobile news is identified based on the similarity comparisons, then the identified mobile news is selected for providing to mobile devices. In one embodiment, the selected mobile news may be sent using a push mechanism, such as RSS feeds, or the like. In another embodiment, the selected mobile news may be made available for any of a variety of pull mechanisms, enabling the news articles formatted for mobile computing devices to be accessed by a mobile device, instead of having the mobile device attempting to access news articles formatted for non-computing devices.

If an insufficient amount of mobile news is identified, then a revised similarity comparison is performed by modifying the weighted and/or sorted keyword list. In one embodiment, a virtual title is generated that is created by concatenating titles from each of the current mobile news. From the virtual title, keywords are extracted and sorted based on a frequency of occurrence, and weighting for each keyword based on criteria that may be based on desired features for currently popular non-mobile news. Thus, by using criteria associated with non-mobile news, mobile news that might not otherwise be considered to be well known or popular might be selected. This modified keyword list may then be used to identify currently popular news for mobile news. The selected currently popular news may then be sent or made available for requests through push and/or pull mechanisms, enabling the mobile devices to obtain news articles formatted for mobile computing devices, instead of attempting to access news articles that are formatted for non-mobile computing devices. Again, such news articles that are formatted for non-mobile computing devices include at least one element that is not compatible with a mobile device, resulting in an error message at the mobile device, and/or otherwise, inaccessibility of at least a portion of the news articles. Attempting to access news articles formatted for non-mobile computing devices might also result in a page that is formatted too large for a mobile device's screen, such that a user is likely to become frustrated attempting to read the news article. In one embodiment, therefore, the user is provided access to news articles that are formatted specifically for display on the user's mobile device.

It should be noted that while news articles are disclosed as one type of content that may be managed through various embodiments described herein, the invention is not so limited. Thus, other forms of content may also be managed using the invention, including, but not limited to, blog content, music content, video content, photographs, educational content, merchant content, and the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, mobile news selection manager (MNSM) 106, desktop content services 107-108, and mobile content services 120.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, or the like. Thus, client devices 102-104 represent various non-exhaustive, non-limiting examples of mobile devices.

Client device 101 may include virtually any computing device that typically connects using a wired communications medium such as personal computers, multiprocessor systems, microprocessor-based or programmable consumer electronics, network PCs, or the like. Thus, client device 101 represents one non-exhaustive, non-limiting example of a desktop or non-mobile device. However, it should be noted that, in one embodiment, one or more of client devices 101-104 may also be configured to operate over a wired and/or a wireless network. Such functionality however, does not, in itself, constitute whether the device is mobile or non-mobile. Rather, portability provides a better, non-exhaustive, distinguishing characteristic.

In any event, client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as MNSM 106, or the like. Such user account, for example, may be configured to enable the user to receive emails, send/receive IM messages, SMS messages, access selected web pages, or participate in any of a variety of other social networking activity. However, managing of messages or otherwise participating in other social activities may also be performed without logging into the user account. Thus, client devices 101-104 may receive messages, news, or the like, using push mechanisms that 'push' the messages, news, or the like, to the client device. Client devices 101-104 may also receive messages, news, or the like, using a pull mechanism where a request may be sent from the client device to another device requesting the messages, news, or the like is sent to the client device.

Client devices 101-104 may include one or more applications that enable a user to read news articles that may be made available using push and/or pull mechanisms. In one embodiment, a user of a client device may further send a news article, send a link to a news article, or otherwise inform another user about a news article. In one embodiment, various content services, such as desktop content services 107-108 and/or mobile content services 120 may monitor news articles and identify various information about the news articles, including, but not limited to when (time, date, et cetera) the news is published or made available for access over a network; a count of how often a news article is read; a count of how often a news article is sent (including emailed, or referenced) to another client device; or the like. For example, various tags may be maintained for a news article indicating a relationship with another news article, a topic of interest, a keyword, or the like. In one embodiment, such information, or meta-data, about the news articles may be made available for other network devices.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple MNSM 106, desktop content services 107-108, and client device 101 with other computing devices, including potentially through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Desktop content services 107-108 represent a plurality of network devices that may provide access to a variety of different content and/or services. In one embodiment, Desktop content services 107-108 might represent websites that provide different educational services, financial services, blogs, location services, music services, online dating services, maps, images, job services, games, merchant sites, health sites, and/or virtually any other content and/or service information for which a user might seek over a network. For example, in one embodiment, desktop content services 107-108 might be configured to provide access to various news articles. Such news articles may be provided in a format that makes them available to non-mobile client devices. Thus, in one embodiment, such formatted news articles might be configured such that they may not be readily readable, and/or even accessible to a mobile device. Such may arise, for example, because of the content might employ scripts, programming languages, mark-up languages, or the like, that are incompatible for mobile devices, such as client devices 102-104.

For example, because many mobile devices may include smaller screen sizes that a traditional desktop or non-mobile device, news articles formatted for a 'standard' size desktop screen may be difficult or impossible to see on a mobile device. Because many mobile devices may lack an ability to open multiple windows, frames, or screens at a time, multi-tasking may be restricted, which may affect how a news article may be displayed. Similarly, many mobile devices may be unable to access news articles formatted using Flash, or similar other applications. A news article might employ special characters that may not be viewable on a mobile device. As such, there may be a plurality of reasons that a given news article might be inaccessible and/or otherwise incompatible for viewing at a mobile device. Thus, in one embodiment, mobile content services 120 may be configured to provide various content and/or services, including, but not limited to news articles, that may be configured for access by a mobile device, such as client devices 102-104. It is noted, however, in at least one embodiment, desktop content services 107-108 may also provide at least some news articles formatted such that they are accessible and readable on a mobile device.

It may be noted further that for a variety of reasons, at least some content, including news articles, may not be available from desktop services 107-108 for use on mobile devices. Thus, in one embodiment, content made available for a desktop or non-mobile device might not be provided in a mobile device format from desktop services 107-108. Thus, news articles, and/or other content availability might be different between desktop and mobile devices. For example, due to licensing agreements, expenses, time, or the like, an article of news might be made available for desktop devices, but not made available for a mobile device. For example, in one embodiment, desktop services 107-108 might provide news articles in a non-mobile readable format that might in theory be re-formatted to be read by mobile device. However, due to licenses, and/or other legal issues, such re-formatting might be prohibited. Moreover, some licensing might even prohibit providing the non-mobile news articles to a mobile device, even if the mobile device is configured to be able to read at least some of the news articles and/or other content. Thus, formatting includes but is not limited to licensing constraints as well as physical/computer program constraints. In one embodiment, news articles that may be similar, although not identical with respect to a body, a title, a source, a time window, and/or other parameters, might be made available from mobile content services 120.

As noted above, news articles may be identified whether or not it is current (within a given time window), archived, and/or how popular it may be based on various criteria, including, but not limited to how often it is read (or accessed), how often it is mailed (via any of a variety of mechanisms) to another user, or the like.

Devices that may operate as desktop content services 107-108, and/or mobile content services 120 include, but are not limited to personal computers, desktop computers, multiprocessor systems, microprocessor-based or programmable consumer electronics, network PCs, servers, network appliances, and the like.

MNSM 106 includes virtually any network device that may be configured to select news for access by a mobile device, such as mobile devices 102-104, including being formatted for mobile devices, based on a similarity of available mobile news articles to news determined to be currently popular on desktop devices, such as made available through desktop content services 107-108, or the like.

MNSM 106 may be configured to determine a set of titles for news that is determined to be currently popular on desktop devices. MNSM 106 may then be configured to identify mobile news articles that may be similar to weighted keywords from the set of titles based on a comparison of mobile news' titles, bodies, and/or other parameters, including, but not limited to time, date, numbers, or the like. If an insufficient number of mobile news articles are identified, MNSM 106 may be further configured to identify mobile news articles using ranked keywords selected from a virtual title comprising a concatenation of titles from available mobile news articles. The keywords may be ranked using criteria that may be based on characteristics of currently popular news; current issues in a given country, society, or the like; political issues for a country, a society, an organization, or the like; and/or any of a variety of other criteria that may be selected and used as a weighting factor. MNSM 106 may then provide access to the selected mobile news articles through a push and/or pull mechanism. Non-exhaustive non-limiting examples of a push mechanism includes RSS feeds, mailing lists, and the like; while a non-exhaustive non-limiting example of a pull mechanism might include bulletin boards. Thus, as used herein, the terms "pull" or "push" refer to the user experience, not necessarily the underlying technology. For example, the user experience of RSS feeds is push, although the technology involves a client that automatically pulls new content. MNSM 106 may employ a process substantially similar to those shown in FIGS. 4-7 to perform at least some of its actions.

Devices that may operate as MNSM 106 include, but are not limited to personal computers, desktop computers, multiprocessor systems, microprocessor-based or programmable consumer electronics, network PCs, servers, network appliances, and the like.

Although MNSM 106 is illustrated as a distinct network device, the invention is not so limited. Thus, a plurality of network devices may be configured to perform the operational aspects of MNSM 106. For example, in one embodiment, the identifying various non-mobile and/or mobile news articles, may be performed within one or more network devices, while determining a similarity and/or providing the resulting mobile news articles for access by a mobile device may be perform by one or more other network devices. However, other combinations are also possible. Thus, the invention is not to be construed as being narrowed by the arrangement illustrated in FIG. 1, and others are also within the scope of the invention.

Illustrative Client Environment

Figure 2:
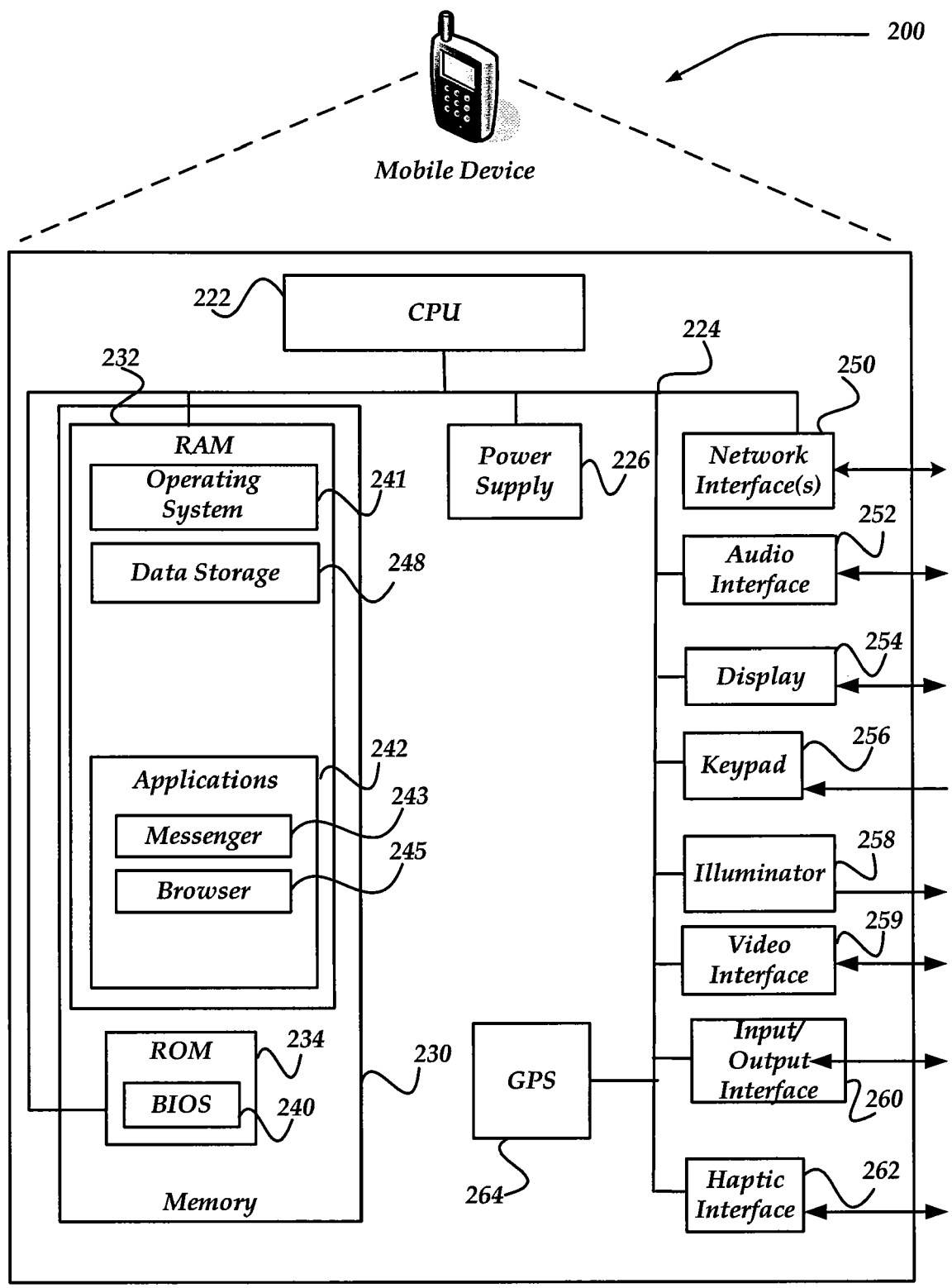
FIG. 2 shows one embodiment of a client device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by mobile device 200 to store, among other things, applications 242 and/or other data. For example, data storage 248 may also be employed to store information that describes various capabilities of mobile device 200, as well as store an identifier. The information, including the identifier, may then be provided to another device based on any of a variety of events, including being sent as part of a header during a communication, sent upon request, or the like. In one embodiment, the identifier and/or other information about mobile device 200 might be provided automatically to another networked device, independent of a directed action to do so by a user of mobile device 200. Thus, in one embodiment, the identifier, and/or device capability information might be provided over the network transparent to the user.

Moreover, data storage 248 may also be employed to store personal information including but not limited to contact lists, personal preferences, data files, graphs, videos, or the like. Data storage 248 may further provide storage for user account information useable with one or more message addresses, message folders, or the like. Thus, data storage 248 may include user preferences such as whether messages are to be automatically pushed to mobile device 200, pulled by the mobile device 200, or the like. However, data storage 248 is not limited to merely this information and other information may also be included. For example, data storage 248 might include news articles. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VoIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), eXtensible Markup Language (XML), and the like, to display and send a message. However, any of a variety of other mobile compatible web based languages, programs, scripts, or the like, may also be employed.

In one embodiment, a user of mobile device 200 might employ browser 245 to access a network device for display of user interfaces useable to manage access to a news article, and/or other contents/services. Thus, in one embodiment, browser 245 might display various news articles, content, and/or services available through a mobile device.

However, the invention is not constrained to employing browser 245 to enable mobile device 200 to access news articles, and/or other content/services. Thus, messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for mobile device 200.

Illustrative Network Device Environment

Figure 3:
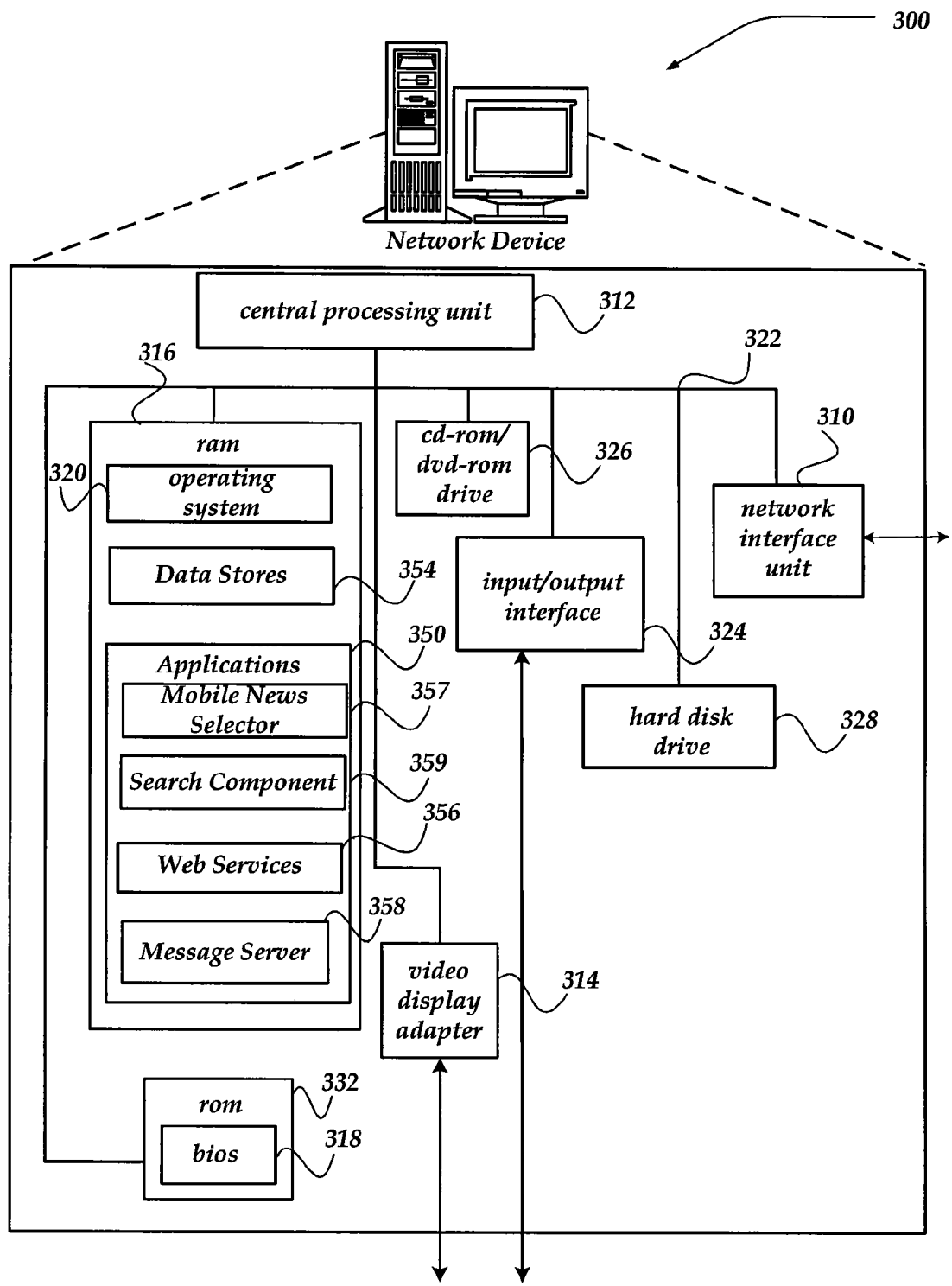
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MNSM 106 of FIG. 1.

Network device 300 includes central processing unit (CPU) 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable storage media implemented in any method or technology for storage of information, such as computer readable instructions, data structures, program modules, or other data. Examples of computer storage media include RAM, ROM, EEPROM, flash memory or other memory, CD-ROM, digital versatile disks (DVD) or other optical storage, magnetic cassettes, magnetic tape, magnetic disk storage or other magnetic storage devices, or any other storage medium which can be used to store the desired information and which can be accessed by a computing device and executed by a processor, such as CPU 312, included therein.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to web pages, news articles, weighting factors, temporary news lists, currently popular news lists, user preferences, and/or the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and mobile news selector 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. Thus, in one embodiment, web services 356 may be configured to provide content, including, but not limited to news articles, in a format useable by a mobile device. However, web services 356 is not limited to providing content in mobile device compatible format, and web services 356 may also provide content in a format useable by desktop computing device (or other non-mobile computing device).

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, RSS feeds, mIRC, or any of a variety of other message types.

Mobile news selector 357 represents virtually any application that may be configured to select news for use by a mobile device using a similarity analysis of currently popular news for a non-mobile device. In one embodiment, mobile news selector 357 may employ a crawler, spider, or other searching mechanism, such as search component 359, to identify currently popular news articles for a non-mobile device. A popularity of a news article may be determined based on a variety of criteria, including, but not limited to manual selection; user log access ranking; community comments on a news article, subject, or the like; rate of comments; most frequently accessed; most frequently 'sent' or 'mailed' to others; a combination of these; and/or other criteria.

Search component 359 may further employ similar and/or different searching mechanisms to identify news articles that are currently available for access by a mobile device. In one embodiment, such mobile news articles may be constrained based on licensing agreements, access constraints, or the like. Thus, in one embodiment, it may be that mobile news articles that are identified through search component 359 as available to a mobile device may be an incomplete set of available news. For example, there may be one or more news providers that may prevent access to the news for mobile devices by search component 359, for a variety of reasons. In any event, search component 359 may identify various accessible mobile and non-mobile news articles useable by mobile news selector 357 in determining news articles formatted for mobile devices that are similar to currently popular news articles formatted for non-mobile devices. In one embodiment, search component 359 may be provided a list of sources for the various news articles. For example, in one embodiment, search component 359 might be provided with links to desktop content services 107-108 and mobile content services 120. In another embodiment, search component 359 may perform a search for and obtain a link to such news articles for mobile and/or non-mobile devices.

In any event, mobile news selector 357 may identify various weighting factors, criteria, or the like, useable to rank order various parameters associated with news articles. Such weighing factors, include, but are not limited to factors that account for interests of a group, organization, society, country, or the like; factors that account for current interests, factors associated with news issues that may be desirable to spark an interest; or the like. Thus, such weighting factors may vary from location to location, day to day, and/or the like. For example, in one situation, weighting factors may be employed to modify a weight for news articles related to the Olympic Games in China, while decreasing a weight for news articles related to forest fires in the United States. Clearly, such weighting is merely an example, and is not intended to be exhaustive or limiting. Other weighting criteria may also be used instead of such example.

Mobile news selector 357 may then employ a variety of similarity analysis mechanisms to identify mobile news articles for providing for access by mobile news devices. For example, mobile news selector 357 may employ a virtual title mechanism to identify mobile news articles. Mobile news selector 357 may employ processes described in more detail below in conjunction with FIGS. 4-7 to perform at least some of its actions.

Moreover, although search component 359 and mobile news selector 357 are illustrated as distinct components, the invention is not so limited. Thus, in one embodiment, search component 359 may operate as a component within mobile news selector 357, within web servers 356, or the like, without departing from the scope of the invention.

Generalized Operation

Figure 4:
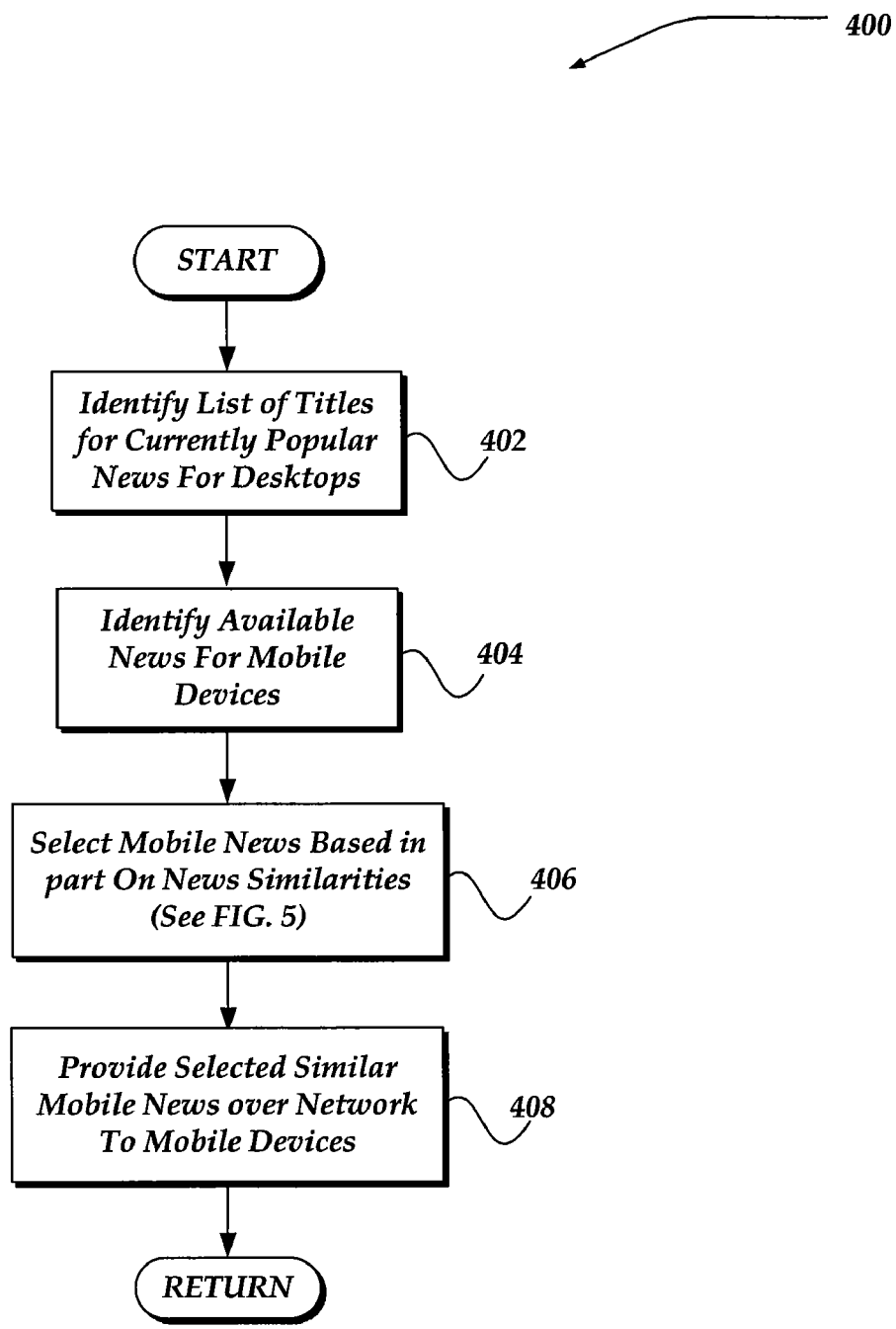
FIG. 4 illustrates a logical flow diagram generally showing one embodiment of a process for managing selection of news for a mobile device based on a selection of currently popular news for a non-mobile computing device.

The operation of certain aspects of the invention will now be described with respect to FIGS. 4-7. FIG. 4 illustrates a logical flow diagram generally showing one embodiment of a process for managing selection of news for a mobile device based on a selection of currently popular news for a non-mobile computing device. Process 400 of FIG. 4 may be implemented with MNSM 106 of FIG. 1, for example.

Process 400 begins, after a start block, at block 402, where a list of titles for currently popular news for desktop (e.g. non-mobile) devices is identified. At block 402, various mechanisms may be used to search accessible network sites, such as desktop content services 107-108 of FIG. 1, or the like, to locate news articles. A subset of the located news articles may be selected based on characteristics that are useable to identify that the news article is current and/or popular, including criteria such as whether the news article is made accessible within a defined time window or time from a current time. However, currency of a news article might also be determined based on whether the article, even if made accessible over a network outside a defined time window, is considered to be popular. Thus, if the news article is being currently accessed by desktop devices within the defined time window, then the news article may be considered to be current. For example, such currency may then be based on relevancy criteria. To provide a simple, non-exhaustive example, consider a news article published to the Internet last year or several years ago about a subject of economical vehicles. However, the news article is identified as most read within a defined time window, like today. Thus, the news article may be determined to be current.

Whether a news article is considered to be popular may also be based on a variety of criteria, such as a manual selection, user accesses, user's actions of providing the news articles (or informing others about the news article, such as by email), reader's ratings, comments; and/or other criteria, including but not limited to those described above. In one embodiment, a list of titles may then be generated from the identified list of currently popular news articles for desktops.

Processing then flows to block 404, where a list of available news articles is identified for mobile devices. In one embodiment, the list might include, but is not limited to titles, news bodies, meta-data about the news articles, and/or the like. In one embodiment, popularity and/or currency of the news article might be considered relevant. Instead, in one embodiment, accessibility of the news articles by mobile devices might be a criterion for selection of the mobile device news articles.

Processing continues to block 406, which one embodiment is described in more detail below in conjunction with FIGS. 5-6. Briefly, however, at block 406, a similarity analysis is performed between titles of currently popular news articles formatted for non-mobile devices and accessible news articles from various mobile news pools, sites, or the like, to select mobile news articles (news articles that are formatted for mobile computing devices). After completion of block 406, a set of one or more mobile news articles may then be made available at block 408 using a push and/or a pull mechanism, instead of providing news articles that are formatted for non-mobile computing devices. That is, because it is recognized that news articles that are formatted for non-mobile computing devices are likely to have problems in readability, accessibility, or the like, by a mobile device, such news articles are not sent to the mobile device, or otherwise made accessible to the mobile device. Process 400 then returns to a calling process to perform other actions.

Figure 5:
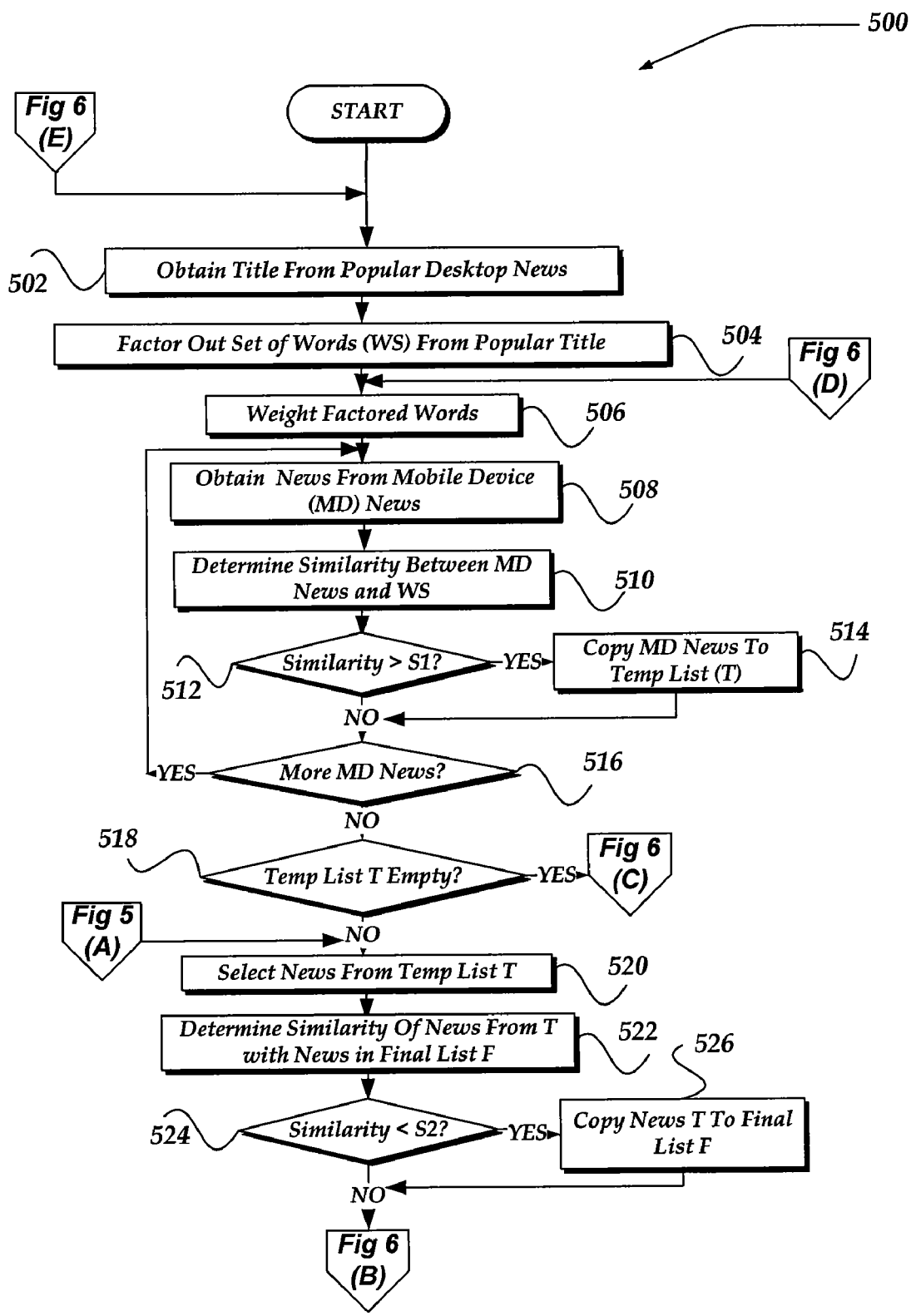
FIGS. 5-6 illustrate a logical flow diagram generally showing one embodiment of a process for managing selection of news for the mobile device using weighted virtual title similarities between popular current news for a non-mobile device and news for a mobile device.
Figure 6:
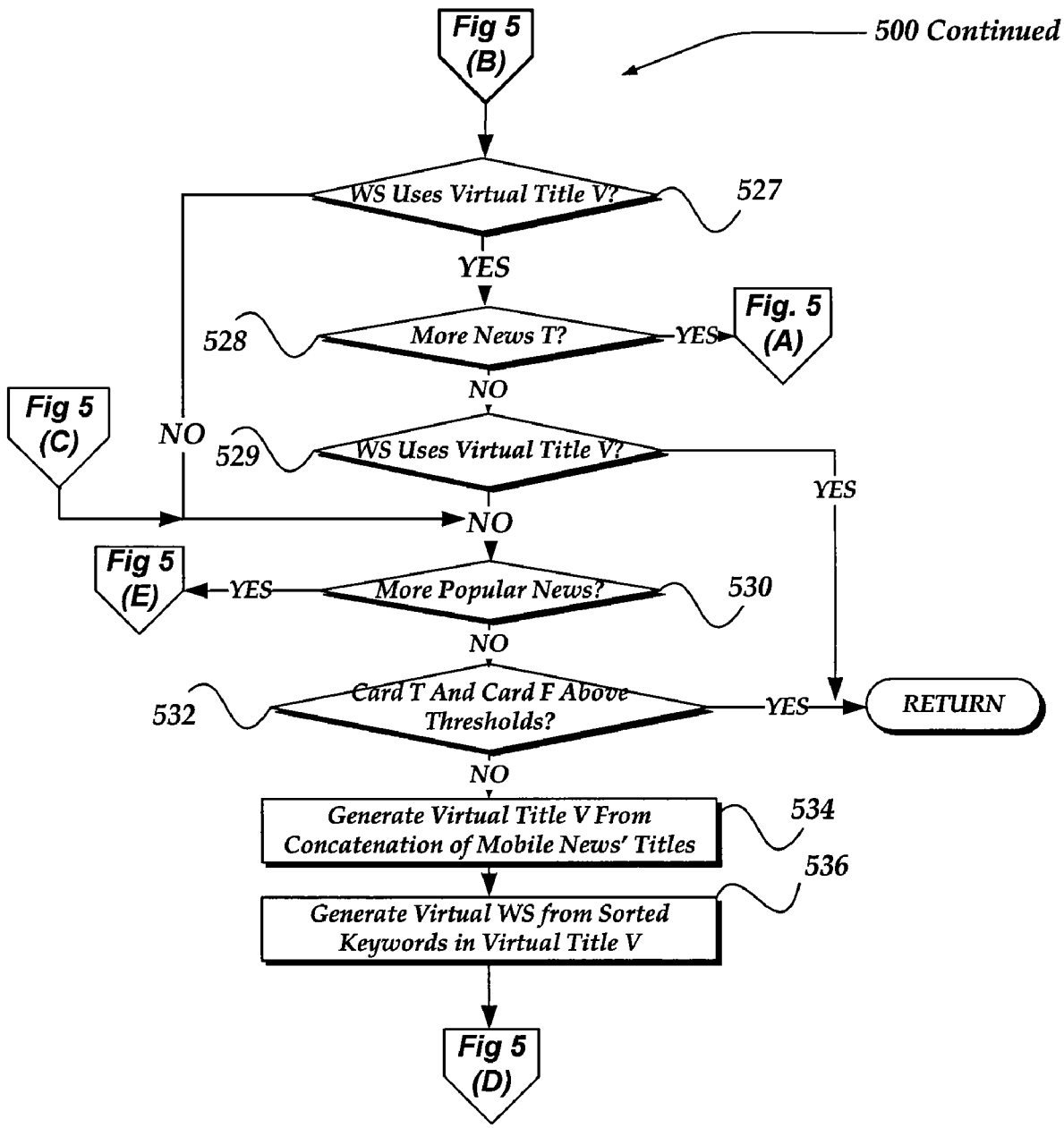

FIGS. 5-6 illustrates a logical flow diagram generally showing one embodiment of a process for managing selection of news for the mobile device using weighted virtual title similarities between popular current news for a non-mobile device and news for a mobile device. Process 500 of FIGS. 5-6 represents one possible embodiment of block 406 of FIG. 4.

Process 500 begins, after a start block, at block 502, where a title is obtained from the list of titles of currently popular desktop news articles identified at block 402 of FIG. 4. Processing flows next to block 504, where a list or set of words (WS) are obtained from the selected title. Such set of words may be generated to exclude various words considered to be irrelevant, including, but not limited to "and," "with," "the," or the like. Thus, nouns, verbs, adjectives, and/or the like, might be extracted from the title to generate the set of words WS, also known as keywords.

Processing continues next to block 506 where the words WS may then be given a weight based on a frequency of occurrence, and/or other determined relevancy criteria, including, but not limited to those described above. In this manner, political, regional factors, global factors, and/or the like, might be used to further influence the selection of mobile device news. In one embodiment, the weighting is then used to sort the keywords. In one embodiment, keywords with a weighting below some value may be removed from keywords in WS. However, in another embodiment, each keyword may be considered.

Processing flows next to block 508, where a news article is obtained from the list of mobile news articles identified at block 404 in FIG. 4. Continuing to block 510, a determination is made whether the mobile news article is similar to the currently popular desktop news article, based on the weighted sorted keywords in WS. For example, in one embodiment, a similarity check may be performed to determine if keywords in WS are found in a title associated with the mobile news article. Likewise, a similarity check may also be performed to determine if keywords in WS are found in a body of the mobile news article. Similarity however is not limit to merely analyzing titles, and a body of a news article. For example, similarity analysis may also be performed based on such parameters that include but are not limited to a time, date, and/or other various meta-data about the mobile news article. In one embodiment, similarity analysis might provide a value that may be a combination of weighted similarity findings. Thus, for example, finding a similarity of higher weighted keywords in WS might provide a higher similarity value than a similarity of lower weighted keywords in WS.

Processing then flows to decision block 512, where the resulting similarity value is evaluated to determine if it is above some threshold S1. Threshold S1 may be determined based on a variety of criteria, including engineering judgment, statistical analysis, or the like. For example, in one embodiment, threshold S1 may be set to a value that is directed towards providing about 5-10 different mobile news articles being identified for a given keywords in WS. However, the invention is not constrained to these values, and others may also be employed, without departing from the scope of the invention. In any event, if the similarity value is greater than threshold S1, processing flows to block 514, where a copy of the mobile device (MD) news may be moved to a temporary list T. Processing then flows to decision block 516. If the similarity value is determined not to be greater than threshold S1, processing flows to decision block 516.

At decision block 516, a determination is made whether there are more MD news articles to be evaluated against the current keywords in WS. If so, processing loops back to block 508; otherwise, processing continues to decision block 518.

At decision block 518, a determination is made whether the temporary list T includes at least one MD news article. It should be noted, the temporary list T need not actually include the entire article. For example, in one embodiment, a reference, pointer, or the like, to the MD news article might be placed into temporary list T instead, without departing from the scope of the invention. In any event, if it is determined that temporary list T is empty, processing branches to decision block 530 (of FIG. 6, (C)); otherwise, processing continues to block 520.

At block 520, an MD news article is selected from the temporary list T. Processing flows next to block 522, where a determination is made whether the MD news article selected in different from other MD mobile news articles in a final news list F. Initially, the final news list F might be an empty set. Thus, in a first pass, the selected MD news article would be considered to be different. Such actions are directed towards reducing redundant articles, or articles that may be about similar subject matter, or the like. It should be noted, however, that such actions of removing similar MD news articles need not be performed. In this matter, users might be able to obtain articles on a mobile device that are similar, but may provide a different perspective of a subject matter. In any event, if the similar articles are to be removed, such similarity analysis might include comparing checking occurrences of keywords, in the MD news article to each of the news articles in final news list F. However, similarity may also be based on evaluations of meta-data, or the like. A similarity value may be obtained based on such analysis. Processing then flows to decision block 524, where a determination is made whether the similarity value from block 522 is below a threshold S2. Threshold S2 may be selected based on various criteria, including but not limited to those described above for threshold S1. If the similarity value from block 522 is below the threshold S2, processing flows to block 526, where the MD news article (or link, pointer, or the like) is moved to final list F. Processing flows next to decision block 527 (of FIG. 6 (B)). If the similarity value from block 522 is not below the threshold S2, the news article is deleted from the temporary list T and processing flows to decision block 527 (of FIG. 6 (B)).

At decision block 527, a determination is made whether the weighted keywords in WS are created from Virtual title V, as described below. If so, then processing flows to decision block 528; otherwise, processing loops to decision block 530.

At decision block 528, a determination is made whether there is more MD news in temporary list T. If so, processing loops back to block 520 (of FIG. 5 (A)); otherwise, processing continues to decision block 529.

At decision block 529, a determination is made whether the weighted keywords in WS are created from Virtual title V, as described below. If so, then processing returns to a calling process to perform other actions; otherwise, processing continues to decision block 530. At decision block 530, a determination is made whether there is more currently popular desktop news to be evaluated. That is, have each of the identified currently popular desktop news been evaluated to attempt to locate a MD news article that is similar? If not, then, processing loops back to block 502 (of FIG. 5 (E)) to continue until each of the currently popular desktop news have been evaluated. In which case, processing then flows to decision block 532.

At decision block 532, a determination is made whether a cardinality of MD news articles in temporary list T and a cardinality of MD news articles in final list F are above respective thresholds. A cardinality of MD news articles in the temporary list T or final list F, as referenced herein, is defined to include at least two MD news articles, though the respective thresholds may be set equal to or greater than two. In one embodiment, such thresholds may be determined to ensure that about 10 MD news articles in temporary list T are determined for each currently popular desktop news articles. Likewise, the threshold for final list F may be set to ensure that at least two MD news articles are determined for each of the currently popular desktop news articles. However, the invention is not so restricted, and other thresholds may also be employed. For example, based on statistical analysis, and/or the like, the threshold for final list F might be set to ensure that at least some percentage, such as ½ of the currently popular desktop news articles have been identified with similar MD news articles. Other percentages may also be employed, without departing from the scope of the invention. In any event, if the cardinality of either list is below their respective thresholds, then processing continues to block 534, where a virtual title V may be generated for use in revising the sorted weighted keywords in WS. Otherwise, if the cardinalities are above their respective thresholds, then process 500 may return to a calling process. Thus, if the cardinality of selected news articles formatted for mobile computing devices is below a defined value, a search for more news articles may be performed, at least until the cardinality is at or above the defined value. That is, there is nothing that would prevent the cardinality from the search exceeding the defined value. For example, the cardinality may be significantly greater than the defined value. The desire, however, is that the cardinality is at least at or above the defined value. This is performed to ensure that there is a sufficient number, based on the defined value, of news articles formatted for mobile computing devices available.

At block 534, at noted, a virtual title V is generated. In one embodiment, the virtual title V may be generated by concatenating titles from each of the MD news articles. Processing then continues to block 536, wherein keywords within the virtual title V may then be extracted, weighted, and sorted based on the weightings. In one embodiment, the weightings may be based on a variety of criteria determined from currently popular desktop news. However, the invention is not so limited, and the weightings may also be based on a frequency of occurrence of the keywords in virtual title V; based on external criteria, including, but not limited to political factors, regional factors, and/or the like. Thus, in one embodiment, the keywords may be influenced based on relevancy factors, currency factors, and/or popularity factors of the day, region, country or the like, as determined from desktop news. In one embodiment, keywords having a weighting below some threshold might be deleted from the new keywords in WS. For example, such threshold might be determined such that a desired number of keywords remain—such as 10 or less. Other thresholds may also be employed, without departing from the scope of the invention. In any event, processing then loops back to block 506 (of FIG. 5 (D)) to perform additional analysis using keywords in WS based on a virtual title V that may be influenced (e.g., weighted) by currently popular desktop news, and/or related relevancy factors. In this manner, using virtual title V, an increased number of MD news articles may be selected. Moreover, it is noted, that based on the above focus of currency, popularity, and/or relevancy for desktop news articles, MD news articles may be selected that might not otherwise be selected merely based on a popularity of MD news articles alone. A surprising result might therefore occur where otherwise unviewed, or under-viewed, MD news articles may be selected over more popular MD news articles.

Figure 7:
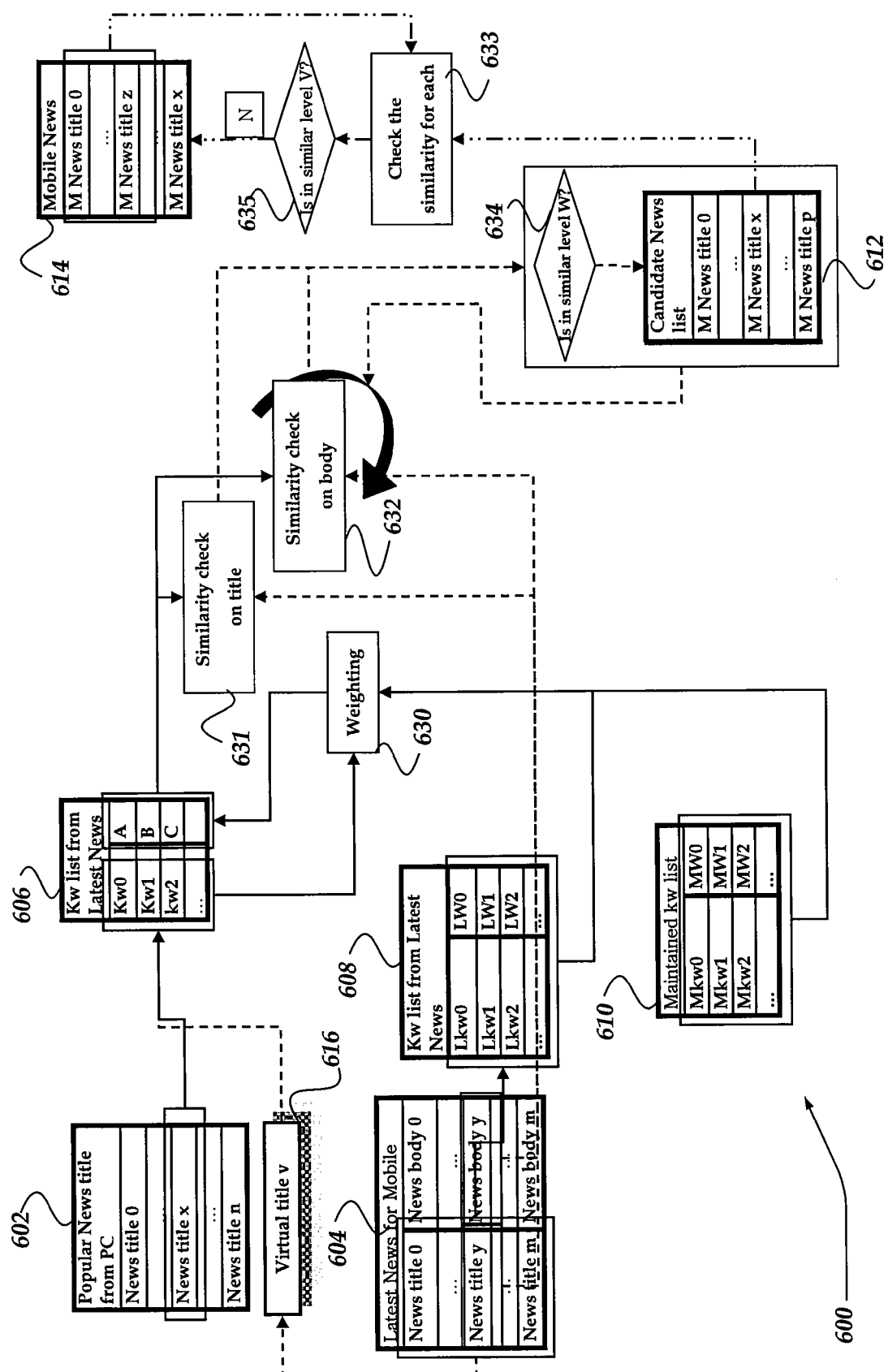
FIG. 7 illustrates a conceptual diagram generally showing one embodiment of processes 400 and 500 of FIGS. 4-6 and related components for automatic selection of mobile device oriented news using titles from popular news from non-mobile sites as well as weighted virtual title from a concatenation of titles in accessible mobile news pools.

FIG. 7 illustrates a conceptual diagram generally showing one embodiment of processes 400 and 500 of FIGS. 4-6 and related components for automatic selection of mobile device oriented news using weighted virtual titles. Conceptual diagram 600 of FIG. 7 may include many more or less components than those shown. However, the components shown are sufficient to disclose an illustrative embodiment for practicing the present invention.

As shown, conceptual diagram 600 includes various components including currently popular desktop titles 602, MD news 604, temporary list T 612, and final list F 614, each of which are described in more detail above in conjunction with FIGS. 4-6. Conceptual diagram 600 also includes keywords list 606 from currently popular desktop titles 602, keywords list 608 from MD news 604, and a maintained keyword list 610. Maintained keyword list 610 may be used to influence and provide weightings for various keywords obtained from keywords list 606, and/or keywords list 608.

Further illustrated in conceptual diagram 600 are weighting function 630, similarity check on title function 631, similarity check on body function 632, and similarity function 633, each of which are also described in more detail above in conjunction with FIGS. 4-6. Likewise, diagram 600 includes threshold evaluators 634-635 also described above in conjunction with FIGS. 4-6. Thus, conceptual diagram 600 is usable to provide an overview of a component/process flow for at least one embodiment.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device to manage communications over a network, comprising: a memory;
 a transceiver to send and receive data over a network; and
 a processor that is operative to perform actions, comprising:
   identifying keywords from a plurality of news articles formatted for non-mobile computing devices, wherein the news articles are further identified as currently popular news articles and wherein the plurality of currently popular news articles is further based on selecting each news article of the plurality of news articles formatted for non-mobile computing devices as a subset of news articles from another plurality of news articles;

comparing the identified keywords with accessible news articles formatted for mobile computing devices;

based on the comparison, selecting news articles formatted for mobile computing devices for which a similarity value exceeds a similarity threshold value at least until a cardinality of selected news articles formatted for mobile computing devices is at or above a defined value;

if the cardinality of selected news articles formatted for mobile computing devices is less than the defined value, then:

concatenating titles from the accessible news articles to generate a virtual title;

extracting keywords from the virtual title;

weighting the extracted keywords from the virtual title based at least on characteristics of the plurality of news articles formatted for non-mobile computing devices; and employing the weighted keywords from the virtual title to perform a similarity comparison with the accessible news articles to select additional news articles formatted for mobile computing devices for which another similarity value exceeds the similarity threshold value; and enabling a mobile computing device to access the selected news articles formatted for mobile computing devices, instead of one or a plurality of news articles formatted for non-mobile computing devices.

2. The network device of claim 1, wherein identifying the keywords further comprises:

extracting the keywords from each title in the plurality of news articles; and weighting the extracted keywords based on at least one of a time, a geographic region relevancy, a frequency of occurrence, or a political relevancy factor.

3. The network device of claim 1, wherein identifying the keywords further comprises sorting the keywords based on a frequency of occurrence of the keyword in a title.

4. The network device of claim 1, wherein comparing the identified keywords with accessible news articles, further comprises:

performing a comparison of each identified keyword with words within each title of the accessible news articles formatted for mobile computing devices;

performing a comparison of each identified keyword with words within each body of the accessible news articles formatted for mobile computing devices; and performing a comparison of each identified keyword with words within meta-data associated with each of the accessible news articles formatted for mobile computing devices; and based on the comparisons, generating the similarity value for each accessible news article formatted for mobile computing devices.

5. The network device of claim 1, wherein selecting each news article of the plurality of news articles further comprises:

selecting each news article based on at least one of a publication date of the news article, whether the news article is identified as a most read news article, whether the news article is identified as a most emailed news article, or based on a rating from a reader.

6. The network device of claim 1, wherein the comparison includes comparing to the identified keywords at least one of a title of a news article formatted for mobile devices, a body of a news article formatted for mobile devices, or meta-data associated with a news article formatted for mobile devices.

7. A processor readable storage medium that includes data and instructions, wherein the execution of the instructions on a computing device provides for managing access to news articles for a mobile device by enabling actions, comprising:

selecting a subset of news articles from a plurality of news articles formatted for non-mobile devices based on determining if each of the plurality of news articles formatted for non-mobile devices satisfies a currently popular news criteria;

generating a list of weighted keywords from titles of each of the subset of news articles;

identifying a plurality of news articles that are formatted for mobile devices;

performing a similarity comparison between elements of each of the plurality of news articles formatted for mobile devices with each weighted keyword;

selecting, based on the similarity comparison exceeding a similarity threshold value, a set of news articles formatted for mobile devices at least until a cardinality of selected news articles formatted for mobile computing devices is at or above a defined value;

otherwise, if the cardinality of selected news articles formatted for mobile computing devices is less than the defined value, then:

concatenating titles from the accessible news articles to generate a extracting keywords from the virtual title;

weighting the extracted keywords from the virtual title based at least on characteristics of the plurality of news articles formatted for non-mobile computing devices;

employing the weighted keywords from the virtual title to perform a similarity comparison with the accessible news articles to select additional news articles formatted for mobile computing devices for which another similarity value exceeds the similarity threshold value; and enabling the mobile device to access the selected set of news articles formatted for the mobile device.

8. The processor readable storage medium of claim 7, wherein execution of the instructions enable actions, comprises:

examining the selected set of news articles from the similarity comparisons to delete news articles that are determined to be similar to each other.

9. The processor readable storage medium of claim 7, wherein generating the list of weighted keywords further comprises employing weightings to the keywords based on at least a determined relevancy factor.

10. The processor readable storage medium of claim 7, wherein the currently popular news criteria includes at least one of whether a news article is identified as a most frequently read, is identified as a most frequently mailed, identified by a manual selection, or identified by community comments.

11. The processor readable storage medium of claim 7, wherein the elements associated with the similarity comparison includes at least one of a title of a news article formatted for mobile devices, a body of the news article formatted for mobile devices, or meta-data associated with the news article formatted for mobile devices.

12. The processor readable storage medium of claim 7, wherein generating the list of weighted keywords further comprises:

extracting the keywords from each title in the plurality of news articles; and weighting the extracted keywords based on at least one of a time, a geographic region relevancy, a frequency of occurrence, or a political relevancy factor.

13. A network device for enabling access to news articles by a mobile device over a network, comprising: a memory; a processor that executes components that perform actions, including:
- a component that is configured to identify:
  - a plurality of news articles formatted for use by non-mobile computing devices; and
  - a plurality of news articles formatted for use by mobile computing devices; and
- a mobile news selection component configured to perform actions, including:
  - selecting a subset of news articles from the plurality of news articles formatted for non-mobile computing devices based on determining if a news article satisfies a currently popular news criteria;
  - generating a list of weighted keywords from titles for each of the subset of news articles;
  - performing a similarity comparison between elements of each of the plurality of news articles formatted for mobile computing devices with each weighted keyword;
  - selecting, based on the similarity comparison exceeding a similarly threshold value, a set of news articles formatted for mobile computing devices;
  - determining a cardinality of the selected set of news articles;
  - if the cardinality of the selected set of news articles is below a defined value, then:
    - generating another list of weighted keywords based on a combination of titles related to the plurality of news articles for mobile computing devices, and
    - employing the other list of weighted keywords to perform another similarity comparison of the plurality of news articles for mobile computing devices to select additional news articles formatted for mobile computing devices, and
  - pushing the selected set of news articles and the additional selected news articles formatted for mobile computing devices to the mobile device; and
  - if the cardinality of the selected set of news articles is at or above the defined value, pushing the selected set of news articles formatted for mobile computing devices to the mobile device.

14. The network device of claim 13, wherein pushing the selected set of news articles further comprises employing an Rich Site Summary (RSS) feed.

15. The network device of claim 13, wherein generating the list of weighted keywords further comprises:
weighting the keywords based on at least one of a time, a geographic region relevancy, or a political relevancy factor.

16. The network device of claim 13, wherein the currently popular news criteria includes at least one of whether the news article is identified as a most frequently read, is identified as a most frequently mailed, identified by a manual selection, or identified by community comments.

17. The network device of claim 13, wherein the elements associated with the similarity comparison include at least one of a title of a news article formatted for mobile computing devices, a body of the news article formatted for mobile computing devices, or meta-data associated with the news article formatted for mobile computing devices.

18. The network device of claim 13, wherein generating the list of weighted keywords further comprises:
extracting the keywords from each title in the subset of news articles; and
weighting the extracted keywords based on at least one of a time, a geographic region relevancy, a frequency of occurrence, or a political relevancy factor.

\* \* \* \* \*

UNITED STATES PATENT AND TRADEMARK OFFICE
CERTIFICATE OF CORRECTION

PATENT NO. : 7,693,907 B1  
APPLICATION NO. : 12/358183  
DATED : April 6, 2010  
INVENTOR(S) : Younghyun Lee et al.

It is certified that error appears in the above-identified patent and that said Letters Patent is hereby corrected as shown below:

On the face page, in field (54), in column 1, under "Title", line 1, before "SELECTION" insert -- NEWS --.

In column 1, line 1, before "SELECTION" insert -- NEWS --.

In column 20, line 4-41, delete "7. A processor readable storage medium that includes data and instructions, wherein the execution of the instructions on a computing device provides for managing access to news articles for a mobile device by enabling actions, comprising: selecting a subset of news articles from a plurality of news articles formatted for non-mobile devices based on determining if each of the plurality of news articles formatted for non-mobile devices satisfies a currently popular news criteria; generating a list of weighted keywords from titles of each of the subset of news articles; identifying a plurality of news articles that are formatted for mobile devices; performing a similarity comparison between elements of each of the plurality of news articles formatted for mobile devices with each weighted keyword; selecting, based on the similarity comparison exceeding a similarity threshold value, a set of news articles formatted for mobile devices at least until a cardinality of selected news articles formatted for mobile computing devices is at or above a defined value; otherwise, if the cardinality of selected news articles formatted for mobile computing devices is less than the defined value, then: concatenating titles from the accessible news articles to generate a extracting keywords from the virtual title; weighting the extracted keywords from the virtual title based at least on characteristics of the plurality of news articles formatted for non-mobile computing devices; employing the weighted keywords from the virtual title to perform a similarity comparison with the accessible news articles to select additional news articles formatted for mobile computing devices for which another similarity value exceeds the similarity threshold value; and Signed and Sealed this Seventh Day of December, 2010

David J. Kappos  
*Director of the United States Patent and Trademark Office* enabling the mobile device to access the selected set of news articles formatted for the mobile device." and insert -- 7. A processor readable storage medium that includes data and instructions, wherein the execution of the instructions on a computing device provides for managing access to news articles for a mobile device by enabling actions, comprising:

selecting a subset of news articles from a plurality of news articles formatted for non-mobile devices based on determining if each of the plurality of news articles formatted for non-mobile devices satisfies a currently popular news criteria;

generating a list of weighted keywords from titles of each of the subset of news articles;

identifying a plurality of news articles that are formatted for mobile devices;

performing a similarity comparison between elements of each of the plurality of news articles formatted for mobile devices with each weighted keyword;

selecting, based on the similarity comparison exceeding a similarity threshold value, a set of news articles formatted for mobile devices at least until a cardinality of selected news articles formatted for mobile computing devices is at or above a defined value;

otherwise, if the cardinality of selected news articles formatted for mobile computing devices is less than the defined value, then:

concatenating titles from the accessible news articles to generate a virtual title; extracting keywords from the virtual title;

weighting the extracted keywords from the virtual title based at least on characteristics of the plurality of news articles formatted for non-mobile computing devices;

employing the weighted keywords from the virtual title to perform a similarity comparison with the accessible news articles to select additional news articles formatted for mobile computing devices for which another similarity value exceeds the similarity threshold value; and enabling the mobile device to access the selected set of news articles formatted for the mobile device. --, therefor.